United States Patent [19]
Berry et al.

[11] 3,787,342
[45] Jan. 22, 1974

[54] HOT-MELT ADHESIVE COMPOSITION CONTAINING GLYCEROL ESTER OF FUMARIC-MODIFIED ROSIN

[75] Inventors: David A. Berry; Albert R. Bunk, both of Columbus, Ohio; Noah J. Halbrook, Walter H. Schuller, Ray V. Lawrence, all of Lake City, Fla.

[73] Assignee: The United States of America as represented by the Secretary of Agriculture, Washington, D.C.

[22] Filed: Feb. 27, 1970

[21] Appl. No.: 15,233

[52] U.S. Cl. .................................. 260/24, 260/28
[51] Int. Cl. ........................... C08c 9/18, C08d 3/40
[58] Field of Search .................... 260/27, 28.5 A, 24

[56] References Cited
UNITED STATES PATENTS
3,377,305   4/1968   House .................................. 260/27
3,253,059   5/1966   Vollmer ................................ 260/897

OTHER PUBLICATIONS

Habrook et al. "Industrial and Engineering Chemistry" 1958, pp. 321 and 322.

*Primary Examiner*—Donald E. Czaja
*Assistant Examiner*—William E. Parker

[57] ABSTRACT

Hot-melt adhesive composition consisting essentially of a substantially linear polyamide resin, having an average molecular weight between 3,000 and 10,000 and a Ball and Ring softening point between 45° and 190° C, and between 5 and 30 parts by weight of glycerol ester of fumaric-modified rosin for each 100 parts by weight of the linear polyamide resin; with a preferred composition containing between 10 and 20 phr of the glycerol ester of fumaric-modified rosin and up to 10 phr of a petroleum-derived wax selected from the group of paraffin and microcrystalline waxes.

6 Claims, No Drawings

HOT-MELT ADHESIVE COMPOSITION CONTAINING GLYCEROL ESTER OF FUMARIC-MODIFIED ROSIN

A non-exclusive, irrevocable, royalty-free license in the invention herein described, throughout the world for all purposes of the United States Government, with the power to grant sublicenses for such purposes, is hereby granted to the Government of the United States of America.

This invention relates to hot-melt polyamide-resin adhesive compositions which are applied hot to various substrates and which upon cooling form a bond adhering the substrates together. More particularly, the invention concerns a hot-melt adhesive composition consisting essentially of a polyamide resin and between 5 and 30 parts by weight of glycerol ester of fumaric-modified rosin for each 100 parts by weight of the polyamide resin.

Hot-melt adhesives are bonding materials known to be applied hot and upon cooling to the solid state to form a bond between substrates. Application of heat to a hot-melt adhesive brings it to a liquid state, and after removal of the heat it sets by merely cooling. Where the cooling is rapid, nearly instantaneous bonding is possible. The hot-melt adhesive system frequently offers increased production speeds and lower costs than other adhesive systems. In general, useful hot-melt adhesive compositions are essentially thermoplastic, all-solid material with no solvent being used therewith. In the past, a large number of natural and synthetic waxes and resins have served as principal constituents in various useful hot-melt adhesive compositions. The natural waxes and resins typically have low strength and melt easily to low viscosity fluids. Generally in hot-melt adhesive these natural materials are blended with various proportions of higher strength and high molecular weight synthetic resins, such as polyamides, polyvinyl acetate, ethylene-vinyl acetate, or the like. In such compositions the synthetic resin acts as a film former imparting the principal adhesion strength and the natural resin serves to lower the adhesive's cost and is useful also therein to improve certain desirable properties of the hot-melt adhesive system. Many adhesives also contain minor amounts of other constituents for improving film formation, imparting tack, flexibility, gloss, and the like. Desirable properties in a hot-melt adhesive are its adhesion strength to various substrates, heat stability at its application temperature for a prolonged period, i.e., useful pot life, ability to adequately wet the substrates to which it is applied, flexibility in its solid state, block resistance, and the like properties. Although various useful hot-melt adhesive compositions are known, there has continued to be a need for other and additional hot-melt adhesive compositions offering lower cost formulations and equivalent and/or improved properties and containing materials hitherto not known to be useful in such compositions. It is to fulfilling those needs that the present invention is directed.

The hot-melt adhesive composition of the invention is based on a synthetic polyamide resin in which resin functions as the principal film-former and tackifying constituent and the glycerol esters of fumaric-modified rosin which glycerol esters function to impart additional tack, flexibility, lower viscosity, and lower cost to the composition. The invention's hot-melt adhesive composition, in relative proportions by weight for each 100 parts of the polyamide resin, consists essentially of the linear polyamide resin or resin mixtures and between 5 and 30 parts of the glycerol esters of fumaric-modified rosin. A preferred embodiment of the composition also contains up to 10 parts by weight, based on each 100 parts by weight of polyamide resin, of a petroleum-derived wax, i.e., paraffin or microcrystalline wax, to lower viscosity, impart improved smear and blocking resistance, and the like. It may also contain minor amounts of various ancillary constituents known to the art as useful, in conventional hot-melt polyamide-resin adhesive compositions.

The polyamide resins used in the composition are thermoplastic reaction products of dibasic acids with diamines and are well known in the hot-melt adhesive art. The particular dibasic acids used for preparation of these polyamide resins are polymerized fatty acids or dimer acids, made by polymerizing unsaturated fatty acids. These dimer acids consist essentially of a mixture of about 36 carbon atom dibasic acids, and usually also contain several isomeric dimers together with a small amount of trimer and higher polymers. When these dibasic acids are condensed with diamines, usually ethylene diamine or another low-molecular weight aliphatic or aromatic diamine, there are provided polyamide resins of a generally linear nature and a relatively neutral character. Here, a relatively neutral character means there are very few remaining unreacted amino and carboxyl groups and, in the polyamide resin molecules, the quantities of each of the reactant moieties are approximately equal. In general, these useful polyamides are relatively high-molecular-weight (av. ~3,000 to 10,000) thermoplastic resins providing an exceptional combination of properties including outstanding adhesion to a variety of substrates, high levels of tensile strength with good elongation, high bond strength, flexibility and toughness, low water absorption, and retention of physical properties on aging. Present commercially available polyamide resins for hot-melt adhesive formulations, and those polyamide resins also useful in the composition, have B&R softening points between about 40° and 190° C. Although frequently only one polyamide resin is employed as the principal constituent of the hot-melt adhesive composition, if desired a blend of several of the polyamide resins may be employed.

In the preferred adhesive composition of the invention there is included up to about 10 parts by weight of a petroleum-derived paraffin or microcrystalline wax for each 100 parts by weight of the polyamide resin included in the composition. Crystalline or paraffin wax is derived from dewaxing of distillate lubricating fractions and microcrystalline wax from dewaxing the residual lubricating fractions of the crude petroleum. The paraffin waxes generally have a melting point in the range of 120° – 160° F, while the microcrystalline waxes have a melting point in the range of 150° – 195° F. The paraffin waxes consist essentially of straight-chain hydrocarbons of about 26–30 carbons per molecule. The microcrystalline waxes consist essentially of branched-chain hydrocarbons of about 41–50 carbons per molecule. In the adhesive composition of the invention, the utilization therein of a petroleum-derived paraffin or microcrystalline wax serves to lower viscosity at hot-melt application temperatures, provides smear and blocking resistance, and advantageously improves wetting of polyester substrates, such as polyethylene terephthalate films. In the composition of the invention the petroleum-derived wax employed therein has a melting point no higher than the B&R softening point of the polyamide resin included therein.

Essential to the hot-melt adhesive composition of the invention is inclusion therein of between 5 and 30 parts by weight, preferably between about 10 and 20 parts by weight, of the glycerol esters of fumaric-modified rosin for each 100 parts by weight of the polyamide resin included in the adhesive composition. Incorporation of the glycerol esters of fumaric-modified rosin in the adhesive composition serves to lower the cost thereof and improves a number of the composition's properties desirable for hot-melt adhesive application purposes. The employed glycerol esters of fumaric-modified rosin in general are the esterification product of fumaric-modified rosin and glycerol to provide substantially complete esterification of all carboxyl groups of the fumaric-modified rosin. The esterification is by conventional techniques and processes, and utilizes glycerol in from a stoichiometric amount up to about 25 percent excess glycerol to react with all carboxyl groups of the fumaric-modified rosin. As used herein, the term "rosin" includes gum, wood, and tall-oil rosins. A fumaric-modified rosin in general is the Diels-Alder condensation product of rosin with fumaric acid in an amount between 4 and 15 parts by weight, preferably 8 and 12 parts by weight for each 100 parts by weight of the rosin. The major product of the Diels-Alder type condensation of fumaric acid with rosin is the tricarboxylic acid, trans-6, 14-dihydrolevopimaric-acid-endo-$\alpha,\beta$-succinic acid. The preparation of fumaric-modified rosin is taught in *Industrial and Engineering Chemistry*, Vol. 50, No. 3, pg. 322-2, March 1958, by Noah J. Halbrook, et al. and also in *J. Am. Chem. Soc.* 80, 368-70 (1958) by Noah J. Halbrook et al. Desirably the preparation of the fumaric-modified rosin, which is subsequently esterified with glycerol is carried out at the reaction conditions which provide for substantially complete reaction of all of the fumaric acid reactant.

Although not essential thereto, the hot-melt adhesive composition of the invention also may contain minor amounts of various other and ancillary constituents as are known to the art in conventional amounts and for purposes well known in hot-melt adhesive compositions containing polyamide resins. These useful ancillary constituents include fillers, pigments, dyes, stabilizers, antioxidants, and the like. Pigments, dyes, fillers, and the like may be used to obtain colored or opaque adhesives and to reduce cost or to impart firmness. Illustrative of fillers are titanium dioxide, clay, diatomaceous earth, and the like. To avoid discoloration, gelation, or physical separation of the composition's constituents during excessive or prolonged heating of its melt state, stabilizers may be included. Illustrative of these stabilizers are sodium benzoate, calcium stearate, sodium sebacate, and the like. When used in the hot-melt composition, the sum total of all the various included ancillary constituents generally will not exceed about 25 percent by weight of the composition, and of course the amount of each included should not appreciably detrimentally effect the adhesive properties of the composition to such an extent as to render the composition not useful for the particular hot-melt application being contemplated.

In general, the hot-melt composition of the invention is prepared simply by melting and mixing together its lower melting constituents, and then adding and mixing therein the high-melting constituents, at a temperature above its melting point. Its preparation aspects closely approximate those conventional in preparation of the prior art hot-melt adhesive compositions. Thus one may employ extruders, kneading-type mixers, varnish kettles, or other like equipment suitably provided with heating means, e.g., oil or steam jackets, electric coil heaters, etc.

The glycerol esters of fumaric-modified rosin, which are included in the composition of the invention, will be more fully understood from the several illustrative preparations thereof which follow.

EXAMPLE A

In this sample a commercial grade, WW gum rosin of acid number 165, color grade WW, and having a content of 60 percent by weight abietic acids is used and condensed with 10 parts of fumaric acid per 100 parts of the rosin to provide the fumaric-modified rosin which subsequently is esterified with glycerol in accordance with the following procedure:

A 5-liter, 3-necked flask is charged with 2,000 grams of the rosin. The flask is equipped with a stirrer, dropping funnel, inert gas inlet, thermometer, short air-cooled condenser and water trap, topped with a water-cooled condenser. The rosin is heated to 200° C with slow stirring under a nitrogen-gas sweep of 5 to 10 ml per minute. After the water forming on heat-up is removed, 200 grams of fumaric acid is added slowly, to prevent frothing. The condensation is slightly exothermic. Heating at 200° C with stirring under a blanket of nitrogen gas is continued for 1 hour. The resulting fumaric-modified rosin, yield 2,184 grams, has an acid number of 233, USDA color grade WG. The trap contains about 11 ml. of water and 6 ml of oil.

A 10 percent excess of glycerol over the stoichiometric amount to react with all of the carboxyl groups present in the fumaric-modified rosin is employed for esterification. This is calculated as follows:

233 mg of KOH per gram of rosin
233×32.3/561=133.5 mg. glycerol per gram of rosin
133.5 × 2184 = 293.0g + (10 percent of 293) = 322 g. of glycerol Thus, 322 grams of glycerol is added to the flask and the nitrogen flow adjusted to about 30 ml per minute. Over a four-hour heating period the temperature is gradually increased from 200° to 275° C. During this time the acid number drops to 37. The temperature of 275° C is held for an additional 1.5 hours. The resulting glycerol esters of fumaric-modified rosin have an acid No. 12.5, Ball and Ring softening point 127° C, USDA color grade WG.

During the entire preparation there is collected in the trap about 200 grams of which 165 ml are water and 35 ml are oils. The materials balance on the basis of employing 2,000 grams of rosin, 200 grams of fumaric acid, and 322 grams of glycerol for a total of 2,522 grams of reactants less the 200 grams water and oils collected in the trap calculates for a product weight of 2,322 grams. Actual yield of glycerol esters of fumaric-modified rosin is found to be 2,313 grams with an unaccounted loss of 9 grams.

EXAMPLE B

The preparation described in Example A is followed exactly except that in preparing the fumaric-modified rosin there are employed only 5 parts of fumaric acid per 100 parts of the rosin instead of the first example's 10 parts of fumaric acid per 100 parts of the rosin. A corresponing decrease is calculated in the amount of glycerol used. The resulting glycerol ester of fumaric-modified rosin has a Ball and Ring softening point of 99° C.

EXAMPLE C

The preparation described in Example A is repeated except that there is employed a 20 percent excess of glycerol over that required to react with all carboxyl groups of the fumaric-modified rosin. The resulting glycerol esters of fumaric-modified rosin have a Ball and Ring softening point of 85° C.

FORMULATION 1, 2, AND 3

There are prepared the following basic formulations, containing a polyamide resin and the glycerol esters of fumaric-modified rosin, to illustrate embodiments of the hot-melt adhesive composition of the invention.

| Formulation | 1 | 2 | 3 |
|---|---|---|---|
| Parts by weight of the glycerol ester of fumaric-modified rosin for each 100 parts by weight of the polyamide resin | 10 | 15 | 20 |
| Ingredients | | | |
| Polyamide Resin, soft.pt~105°C | 50 | 50 | 50 |
| Glycerol Esters of Fumaric-modified Rosin | 5 | 7.5 | 10 |
| Paraffin Wax, m.p.~134°F | 2.5 | 2.5 | 2.5 |

Formulations 1, 2, and 3 are prepared by placing the weighed amounts of glycerol esters of fumaric-modified rosin and paraffin in a stainless-steel kettle equipped with a stirrer and an oil-bath surrounding the kettle. The kettle's contents are heated to about 275° to 285° C with stirring and held at that temperature until the charge is molten and appears to be a uniform composition; generally this requires between one-half to 1 hour. The polyamide resin then is added and mixed therein until the composition again appears to be a molten mass free of lumps and the like. If desired, the composition may be permitted to cool and to solidify and then at a later time reheated to a molten state for application as a hot-melt adhesive. Otherwise the composition is maintained and/or brought to a suitable temperature, generally about 140° F, for hot-melt application and utilized.

To illustrate utility and advantageous properties exhibited by the foregoing illustrative basic formulations as embodiments of hot-melt adhesive compositions of the invention, a number of physical properties are determined for compositions of these formulations and for the compositions utilized to bond various adherends by hot-melt techniques. For comparison therewith there also are prepared in a like manner the same formulations, except that no glycerol esters of fumaric-modified rosin are included therein and except that the glycerol esters of fumaric-modified rosin constituent is replaced on an equal weight basis by a highly stabilized ester of a completely hydrogenated rosin such as Foral 85, and by the pentaerythritol ester of partially hydrogenated rosin, and then in a like manner various physical properties determined for these comparison formulations and their bonding of adherends.

The following tables I through IV present illustrative physical properties determined for a number of composition embodiments of the invention along with corresponding data determined on the just-mentioned comparison formulations. Details on preparation of samples for determination of the reported property data along with description of the tests conducted also are presented. Peel strength illustrates the comparative peel or stripping of the adhesive bond. The peel strength is the average load per unit width of bond line required to separate progressively one member from the other over the adhered surface at a separation angle of approximately 180° and at a separation rate of 12 inches per minute jaw speed. Samples prepared for the peel strength test are laminated in a press at 300° F, 100 psi, for 5 to 10 seconds. The samples are placed between two stainless steel plates of one-eighth inch thickness. Two sheets of 10 mil tetrafluoroethylene polymer are used between the stainless steel plates and the samples. This was done to aid in removal of samples should hot-melt adhesive get on the plates during lamination. The peel strength of the adhesive bond is evaluated using ASTM Method D903-49 except that the number of test specimens is reduced to two.

The wettability of the adhesive on the substrate is determined by a visual check, rating the specimens excellent, good, fair, or poor.

A modification of TAPPI Method T454ts-66 is used to determine the flexibility of the film of hot-melt adhesive. Films of adhesive are drawn down on 60-pound all-purpose litho paper. A modification of TAPPI Method T465sm-52 is used for creasing the paper with an approximate 2-mil thick hot-melt adhesive film. The weight used to crease the specimens is 1 kg per 5 linear centimeters. With the hot-melt side up on a table a 3-inch diameter, clear plastic tube, approximately 3 inches high, is placed on each specimen. Sand is placed in the cylinder to a depth of one inch. The same is saturated with corn oil which has been dyed blue with oil blue NE. The dyed oil penetrates the specimen wherever there is a break in the hot-melt film. After 16 hours at room temperature, the samples are evaluated on a rating scale of excellent, very good, good, fair, or poor. An excellent rating indicates no penetration of dyed oil, and a poor rating indicates that the underside of the 4-inch square had more than 50 percent of its area colored with the dyed oil.

The block resistance of the hot-melt systems is determined by TAPPI Method T477m-47. The tests are run at 120° F in an uncontrolled humidity oven at 0.5 psi.

The viscosity of the hot-melt adhesives is determined at 135° C.

TABLE I

| | | Peel Strength Adhesion, PLI[a] | | | |
|---|---|---|---|---|---|
| Hot-Melt Adhesive Composition Containing: | Concentration, phr[b] | Polyethylene Terephthalate Film | 40-Lb Kraft Liner Board | Laminate: 40-Lb Kraft Liner Board/ Aluminum Foil | After Heat-Stability Test[d] on Polyester Film |
| No Rosin or rosin derivative | 0 | 4.9 | 2.0 | 5.0 | 5.1 |

TABLE I—Continued

| Hot-Melt Adhesive Composition Containing: | Concentration, phr[b] | Peel Strength Adhesion, PLI[a] Polyethylene Terephthalate Film | 40-Lb Kraft Liner Board | Laminate: 40-Lb Kraft Liner Board/ Aluminum Foil | After Heat-Stability Test[d] on Polyester Film |
|---|---|---|---|---|---|
| Highly stabilized ester of completely hydrogenated rosin[c] | 10 | 4.7 | 2.4 | 7.5 | 6.4 |
| Pentaerythritol ester of partially hydrogenated rosin[c] | 10 | 3.4 | 1.4 | 3.0 | 2.6 |
| Glycerol esters of fumaric-modified gum rosin of Ex. A in Form. 1 | 10 | 5.6 | 2.5 | 4.8 | 5.5 |

[a] pli = pounds per linear inch, average of at least 2 specimens.
[b] phr = parts by weight of rosin derivative per hundred parts by weight of polyamide resin.
[c] controls
[d] 18 hours at 350°F, using agitation

TABLE II

| Hot-Melt Adhesive Composition Containing: | Conc. phr[b] | Peel Strength[c] Adhesion, pli[a] |
|---|---|---|
| Highly stabilized ester of completely hydrogenated rosin | 10 | 4.8 |
|  | 15 | 4.8 |
|  | 20 | 4.5 |
| Pentaerythritol ester of partially hydrogenated rosin | 10 | 4.7 |
|  | 15 | 3.5 |
|  | 20 | 4.9 |
| Glycerol esters of fumaric-modified rosin of Ex. A in |  |  |
| Form. 1 | 10 | 6.5 |
| Form. 2 | 15 | 5.8 |
| Form. 3 | 20 | 3.0 |

[a] pli = pounds per linear inch, average of at least 2 specimens
[b] phr = parts by weight of rosin derivative per hundred parts by weight of polyamide resin.
[c] Adhesive composition is coated on a polyethylene terephthalate film with a brass drawn-down bar on a stainless-steel, 280°F. hot-plate to a coating thickness of ~2 mils. Specimens then are laminated in a Preco press at 300°F, 100 psi, for 10 sec. Specimens are placed in a constant-temperature room (73°F, 50 percent relative humidity) for 7 days before testing. Peel strength tests are made on an Instron at a speed of 12 in./min.

In addition to the preceding illustrative embodiments of the composition of the invention, one similarly can employ each of the glycerol esters of fumaric-modified rosin of Example B and C in each of the basic formulations 1 through 3 and obtain other illustrative examples of the composition of the invention. While the properties of such prepared additional compositions will not necessarily be identical to the property data determined and reported in the foregoing tables, it will be found that on the whole each of these prepared hot-melt adhesive compositions exhibit adequate properties to enable the composition to be useful in hot-melt adhesive bonding application.

We claim:

1. A hot-melt adhesive composition comprising:
   a. 100 parts by weight of a polyamide resin of a generally linear nature, a relatively neutral character, having an average molecular weight within the range of 3,000 and 10,000, a Ball and Ring softening point between 45° and 190° C., and being the thermoplastic reaction product of a mixture of dimer acids consisting essentially of a mixture of

TABLE III

Viscosity Values for the Polyamide System

| Hot Adhesive Composition Containing | Concentration, phr[a] | Viscosity at 135°C Before Heat-Stability Test | After Heat-Stability Test |
|---|---|---|---|
| No rosin or rosin derivative | 0 | 52.35 | 77.33 |
| Highly stabilized ester of completely hydrogenated rosin[b] | 10 | 44.02 | 104.70 |
| Pentaerythritol ester of partially hydrogenated rosin[b] | 10 | 50.56 | 58.89 |
| Glycerol esters of fumaric-modified gum rosin of Ex. A. in Form. 1 | 10 | 65.91 | 74.36 |

[a] phr = parts by weight of rosin derivative to a hundred parts by weight of polyamide resin.
[b] controls

TABLE IV

Hot-Melt Adhesives Data

| Hot-Melt Adhesive Containing | Concentration phr | Color of Hot-Melt[a] Before Stability Test | After Stability Test | Flexibility of Hot-melt Films[b] Sample 1 | Sample 2 | Blocking Test[c] | Wettability Test[d] Mylar | 40 RLB | 60 APL | Al Foil |
|---|---|---|---|---|---|---|---|---|---|---|
| No rosin or rosin derivative | 0 | Straw yellow | Light brown | E | D | 3 | 4 | 4 | 3 | 3 |

TABLE IV—Continued
Hot-Melt Adhesives Data

| Hot-Melt Adhesive Containing | Concentration phr | Color of Hot-Melt[a] Before Stability Test | Color of Hot-Melt[a] After Stability Test | Flexibility of Hot-melt Films[b] Sample 1 | Flexibility of Hot-melt Films[b] Sample 2 | Blocking Test[c] | Wettability Test[d] Mylar | Wettability Test[d] 40 RLB | Wettability Test[d] 60 APL | Wettability Test[d] Al Foil |
|---|---|---|---|---|---|---|---|---|---|---|
| Highly stabilized ester of completely hydrogenated rosin[e] | 10 | Straw yellow | Dark red brown | E | E | 4 | 4 | 4 | 3 | 3 |
| Pentaerythritol ester of partially hydrogenated rosin[e] | 10 | Straw yellow | Dark red brown | E | E | 4 | 3 | 4 | 3 | 3 |
| Glycerol esters of fumaric-modified rosin of Ex. A in Form 1 | 10 | Brownish yellow | Dark red brown | E | E | 4 | 4 | 4 | 4 | 3 |

[a] Stability test was run at 280 F for 18 hours using agitation.
[b] Flexibility ratings E=excellent, VG=very good
[c] Blocking test was run at 120F for 24 hours at 0.5 psi. Blocking ratings: 4=complete, 3=considerable, 2=slight, 1=no
[d] Substrate abbreviations: Mylar=Mylar film (1-½ mil), 40 KLB=40-lb. Kraft liner board, 60 APL=60 lb all purpose litho paper, Al Foil = 1 mil pure aluminum foil. Wettability ratings: 4 = excellent, 3 = good, 2 = fair, 1 = poor
Applied coating weights in lbs./100 ft²; on Mylar-8.6, on 40 KLB - 24.1, on 60 APL - 23.2, and on Al Foil = 11.1.
[e] controls.

about 36-carbon atom dibasic acids with a low-molecular weight aliphatic or aromatic diamine; and b. between 5 and 30 parts by weight of glycerol esters of fumaric-modified rosin.

2. The composition of claim 1 which also includes up to 10 parts by weight of a petroleum-derived wax having a melting point no higher than the Ball and Ring softening point of the polyamide resin and selected from the group consisting of paraffin wax and microcrystalline wax.

3. A hot-melt adhesive composition comprising:
a. 100 parts by weight of a polyamide resin of a generally linear nature, a relatively neutral character, having an average molecular weight within the range of 3,000 to 10,000, a Ball and Ring softening point between 45° and 190° C. and being the thermoplastic reaction product of a mixture of dimer acids consisting essentially of a mixture of about 36-carbon atom dibasic acids with a low-molecular weight aliphatic or aromatic diamine;

b. 10 to 20 parts by weight of glycerol esters of fumaric-modified rosin, which glycerol esters are prepared by reacting a fumaric-modified rosin selected from the group consisting of fumaric-modified gum rosin, fumaric-modified wood rosin, and fumaric-modified tall oil rosin with sufficient glycerol to esterify the carboxylic acid groups present in the fumaric-modified rosin, thereby to produce an essentially completely esterified fumaric-modified rosin substantially devoid of anhydride groups.

4. The composition of claim 3 wherein the fumaric-modified rosin is gum rosin.

5. The composition of claim 3 wherein the fumaric-modified rosin is wood rosin.

6. The composition of claim 3 wherein the fumaric-modified rosin is tall oil rosin.

* * * * *